(No Model.)
H. WETTSTEIN.
CREAMER OR MILK PITCHER.
No. 359,304. Patented Mar. 15, 1887.
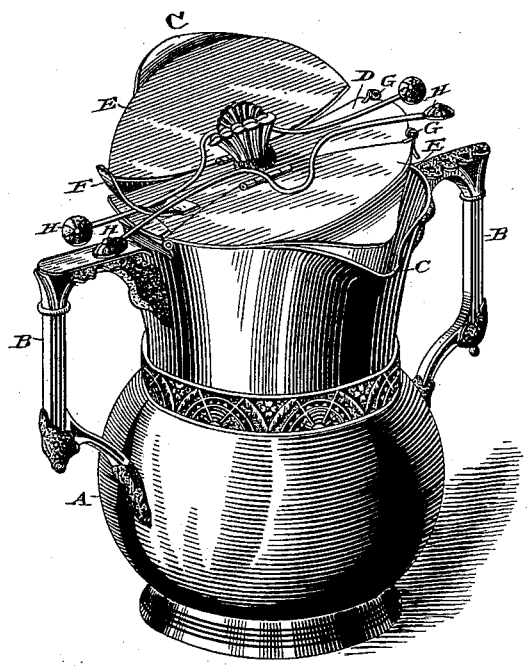
Witnesses:
H. L. Frederick,
A. C. Anderson
Inventor.
Herman Wettstein

UNITED STATES PATENT OFFICE.

HERMAN WETTSTEIN, OF HARVARD, ILLINOIS.

CREAMER OR MILK-PITCHER.

SPECIFICATION forming part of Letters Patent No. 359,304, dated March 15, 1887.

Application filed November 17, 1884. Serial No. 148,164. (No model.)

*To all whom it may concern:*

Be it known that I, HERMAN WETTSTEIN, a citizen of the United States, residing at Harvard, in the county of McHenry and State of Illinois, have invented certain new and useful Improvements in Creamers or Milk-Pitchers; and I do hereby declare the following to be a full, clear, and exact description of the invention.

The object of my invention is to provide a cover for creamers or milk-pitchers, to keep flies or other insects out of them, and to retain the heat of cream or milk where warm cream is preferred for table use to cold cream or milk. I attain these objects by the device to be hereinafter particularly described, reference being had to the accompanying drawing, forming a part of the specification.

The accompanying drawing represents a perspective of a pitcher embodying my invention.

A is the bowl of the milk-pitcher. B B are the handles thereof set opposite each other, so that the pitcher may be conveniently reached from both sides of the table, pitchers having been provided with only one handle heretofore.

C C are the nozzles of the pitcher, placed at opposite sides thereof and running at right angles (or nearly so) with the handles B B, milk-pitchers or creamers having heretofore been provided with only one nozzle set opposite to the handle.

D is the cover or lid of the pitcher, which may be made either in one solid piece or have the two side lids, E E, hinged to it.

F represents a handle, by which cover D may be raised.

G G are springs to hold cover D in position.

H H are the handles by which the side lids, E E, are raised.

Where cover D is provided with the side lids, C C, (one or both,) the cover D may be permanently attached to the bowl; or it may be sprung onto the bowl, so as to allow it to be removed when desired.

I am aware that a cream-pitcher has been made with two spouts and two handles, the handles being located between the spouts. I am also aware that it is old to pivot a weighted lever upon the cover of a pitcher and connect this lever by means of a cord or chain with a hinged lid, and both of these I disclaim.

Having thus described my invention, what I claim as new, and desire to secure by Letters Patent, is—

1. The combination of the pitcher, provided with two spouts and two handles, with the cover D, hinged to the pitcher at one end, and the two side lids, E, hinged to the central lid, substantially as shown.

2. The combination of the pitcher, provided with two spouts and two handles, with the cover D, provided with the handle F at its hinged end, and the two side lids, substantially as described.

3. The bowl A, provided with handles B B, nozzles C C, cover D, side lids, E E, and lid-handles H H, substantially as set forth.

In testimony whereof I affix my signature in presence of two witnesses.

HERMAN WETTSTEIN.

Witnesses:
  H. L. FREDERICK,
  CHARLIE VIERCK.